(12) United States Patent
Weißbrodt et al.

(10) Patent No.: US 10,993,463 B2
(45) Date of Patent: May 4, 2021

(54) METHOD FOR PRODUCING LARGE AGGLOMERATE PARTICLES

(71) Applicant: Symrise AG, Holzminden (DE)

(72) Inventors: Jenny Weißbrodt, Holzminden (DE);
Alexander Diring, Holzminden (DE);
Eric Gruber, Holzminden (DE);
Burghard Rabe, Stadtoldendorf (DE);
Christopher Sabater, Holzminden (DE); Walter Bröckel, Bevern (DE)

(73) Assignee: Symrise AG, Holzminden (DE)

( * ) Notice: Subject to any disclaimer, the term of this patent is extended or adjusted under 35 U.S.C. 154(b) by 830 days.

(21) Appl. No.: 15/163,971

(22) Filed: May 25, 2016

(65) Prior Publication Data

US 2016/0353773 A1 Dec. 8, 2016

(30) Foreign Application Priority Data

May 29, 2015 (EP) ..................................... 15169994

(51) Int. Cl.
| | |
|---|---|
| *A23P 10/20* | (2016.01) |
| *A23P 10/22* | (2016.01) |
| *A23L 23/00* | (2016.01) |
| *A23L 27/00* | (2016.01) |
| *A23L 27/10* | (2016.01) |
| *B01J 2/02* | (2006.01) |

(52) U.S. Cl.
CPC .............. *A23L 23/00* (2016.08); *A23L 27/00* (2016.08); *A23L 27/10* (2016.08); *A23P 10/20* (2016.08); *A23P 10/22* (2016.08); *B01J 2/02* (2013.01); *A23V 2002/00* (2013.01)

(58) Field of Classification Search
USPC ......................................................... 426/285
See application file for complete search history.

(56) References Cited

U.S. PATENT DOCUMENTS

| | | | |
|---|---|---|---|
| 5,130,156 A | 7/1992 | Bergquist et al. | |
| 5,213,820 A * | 5/1993 | Uhlemann | B01J 2/16 209/147 |
| 5,782,011 A * | 7/1998 | Boersen | B01D 1/18 34/366 |
| 5,955,036 A * | 9/1999 | Seyffert | A61K 9/1694 422/139 |
| 6,845,571 B1 * | 1/2005 | Schwarz | B01J 2/04 34/372 |

(Continued)

FOREIGN PATENT DOCUMENTS

| | | |
|---|---|---|
| DE | 20 50 356 A1 | 4/1972 |
| DE | 10 2004 024680 A1 | 12/2005 |

(Continued)

OTHER PUBLICATIONS

Jinapong et al, "Production of instant soymilk powders by ultrafiltration, spray drying and fluidized bed agglomeration," Journal of Food Engineering vol. 84, No. 2, Aug. 7, 2007, pp. 194-205.

(Continued)

*Primary Examiner* — Lien T Tran
(74) *Attorney, Agent, or Firm* — Dilworth & Barrese, LLP

(57) ABSTRACT

The invention is in the technical field of particles; more particularly, the invention relates to large agglomerate particles obtainable by spray-drying agglomeration.

19 Claims, 5 Drawing Sheets

(56) References Cited

U.S. PATENT DOCUMENTS

| | | | |
|---|---|---|---|
| 2005/0158443 A1* | 7/2005 | Grebenkamper | A23L 2/68 426/590 |
| 2006/0034934 A1* | 2/2006 | DeGuise | A61K 9/1688 424/489 |
| 2010/0015320 A1* | 1/2010 | King | A23P 10/20 426/650 |

FOREIGN PATENT DOCUMENTS

| | | |
|---|---|---|
| GB | 1 486 768 A | 9/1977 |
| WO | WO 2007/124745 A1 * | 11/2007 |

OTHER PUBLICATIONS

Kim et al, "Effect of Particle Size and Mass on Nano to Micron Particle Agglomeration," SICE Annual Conference in Sapporo, IEEE, Aug. 2004, pp. 1923-1926.

Parveen et al, "Effect of particle size, liquid content and location on the stability of agglomerates in a fluidized bed," Powder Technology vol. 237, Dec. 20, 2012, pp. 376-385.

* cited by examiner

METHOD FOR PRODUCING LARGE AGGLOMERATE PARTICLES

FIELD OF THE INVENTION

The invention is in the technical field of particles; more particularly, the invention relates to large agglomerate particles obtainable by spray-drying agglomeration.

PRIOR ART

Large particles are an important product for use in the foodstuff sector. For example, flavourings in particle form are added to the food, for example in teabags to round off the taste profile. Large particles, in the form of large agglomerate particles, are mostly obtainable by methods which are expensive in production or which only allow relatively low loads up to about 6%.

Spray drying represents a common method for producing particles in the food sector, said method additionally allowing a high load of the dried particles of up to 30%. A disadvantage of spray drying is the limited particle size, which varies within the range of about 70-100 μm.

By means of spray-bed drying, it is, for example, possible to generate larger particles; however, the limit thereof is about 200 μm. If larger particles are produced using this method, they are generally mechanically unstable and do not withstand mixing processes, transport and dispensing without great abrasion and thus formation of fine dust.

SUMMARY OF THE INVENTION

It is therefore an object of the present invention to provide large particles, more particularly agglomerate particles which are larger than 200 μm preferably larger than 300 μm. It is intended that the agglomerate particles be toxicologically safe for the foodstuff sector. It is a further object of the present invention to provide agglomerate particles which are stable and have a good solubility and low dust values when applied. It is likewise an object of the present invention to provide agglomerate particles which have a high load of active substances, such as flavourings for example. Here, it is intended that the active substances (flavourings) be incorporated in the agglomerate particle such that they are not released prematurely or evaporate before end use.

The present invention therefore provides agglomerate particles obtainable from a method comprising the steps of
 (i) producing pulverulent particles by means of a spray-drying process, in a spray-drying agglomeration device having a spray-drying segment (A) in the upper region of a chamber for drying feed liquid sprayed by a feed liquid atomizer (Z1),
 (ii) spraying the pulverulent particles with a binder liquid, in an integrated fluidized bed (B) in the spray-drying agglomeration device, which bed is situated in the lower region of a chamber, in which region the powder of the spray-drying segment from step (i) is sprayed with a binder liquid by means of a nozzle or atomizer construction (Z2) mounted at the bottom of the fluidized bed (B), the particles being constantly kept in motion and whirled up during production.

It was found that, surprisingly, the agglomerate particles thus produced become especially large. Furthermore, it became apparent that the thus obtainable agglomerate particles have a solid core and, accordingly, the agglomerate particles obtainable according to the invention have low dust values and abrasion values. In particular, the circulation which constantly keeps the particles in motion allows a large probability of collision amongst the particles.

Instead of realizing the agglomeration by a recirculation of powder into the process, an agglomeration is achieved exclusively in the fluidized bed by the additional feeding-in of suitable binder liquids. It was found that, surprisingly, the agglomerate particles thus produced become especially large. Moreover, it became apparent that the integration of a nozzle or atomizer construction (Z2) mounted at the bottom of the fluidized bed (B) is especially advantageous for spraying the binder liquid. Moreover, it became apparent that the constant circulation promotes the probability of particle collision such that large agglomerate particles arise within a short period.

BRIEF DESCRIPTION OF THE DRAWINGS

The invention is additionally illustrated by the following
FIG. 1: Agglomeration spray-drying device,
FIG. 2: Agglomerate particle containing mango flavouring: standard (top), inventive (bottom),
FIG. 3: Agglomerate particle containing chocolate flavouring: standard (top), inventive (bottom),
FIG. 4: Device having nozzle or atomizer construction (Z2) and dam (closure panel) (G) in the fluidized bed (B),
FIG. 5: Arrangement of the nozzle or atomizer construction (Z2),
and
 FIG. 6: Arrangement of the nozzle or atomizer construction (Z2) in the fluidized bed (B) having dam construction (G).

DESCRIPTION OF THE INVENTION

In a preferred embodiment, the nozzle or atomizer construction (Z1) in the internal fluidized bed (B) consists of an arrangement composed of multiple individually arranged nozzles which are all each individually connected to a feed line from which binder liquid or any possible liquid required in the agglomeration process is sprayed. Moreover, the feed line makes it possible for each nozzle to be individually provided with any liquid to be sprayed, and so, depending on which agglomerate particles are required, the composition can be appropriately produced. The number of nozzles can be altered from 1 up to 12 nozzles depending on the size of the spray tower and on the product or the product quality to be achieved. The nozzles can be individually adjusted such that droplet distributions of the sprayed binder liquid from a very fine mist right up to relatively large drops are achieved. This is achieved by varying the cap setting on the nozzles and varying the atomization pressure from 1-6 bar.

In particular, in a preferred embodiment, the nozzle or atomizer construction (Z2) in the internal fluidized bed (B) consists of a ring line, along which nozzles or atomizers are evenly spaced. Such a construction is depicted by way of example in FIG. 4.

In a further preferred embodiment, the nozzle or atomizer construction (Z2) is a concentric ring line or a latticed construction having nozzles or atomizers. An important aspect is the uniformity of the mounted nozzles or atomizers. In the case of the presently described nozzle or atomizer construction (Z2), the nozzles or atomizers can be individually regulated; thus, it is, for example, possible for nozzle or atomizer pressure to be individually regulated and adjusted.

This construction has the advantage that the particles circulating in the fluidized bed can be wetted with a large amount of moisture. Moreover, such a design of the nozzle or atomizer construction (Z2) in the internal fluidized bed (B) supports fluidization, and this is an advantage for obtaining large agglomerate particles.

Figure 4:
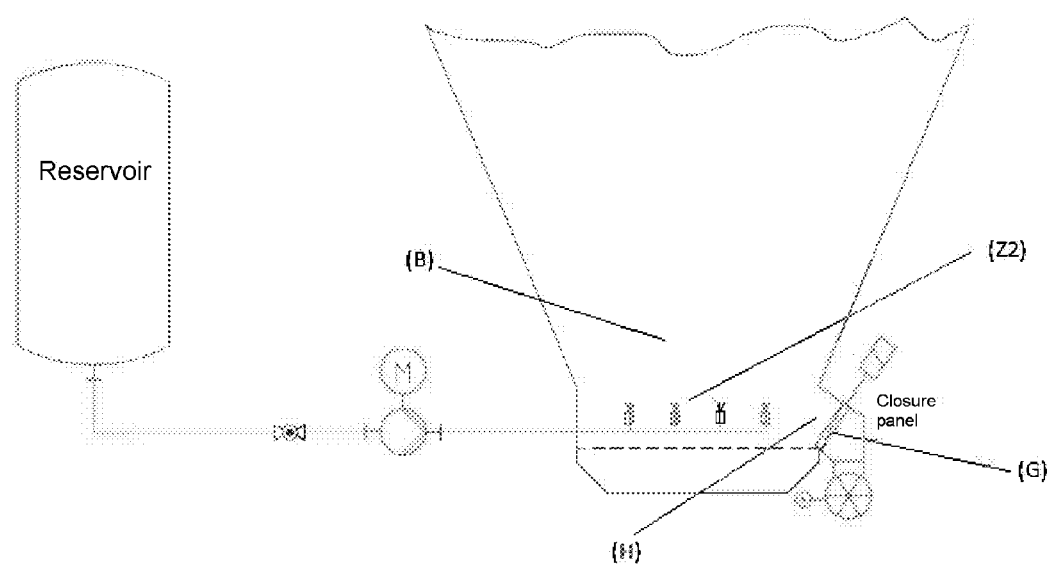
Figure 5:
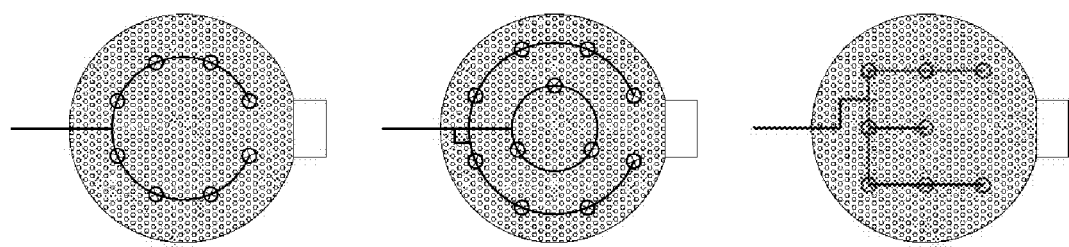
Figure 6:

In a further preferred embodiment, the nozzle or atomizer construction (Z2) comprises at least 1 or 2 or 3 nozzles or atomizers, the nozzles or atomizers preferably being arranged as described above and being depicted by way of example in FIG. 4.

In a further preferred embodiment, the nozzle or atomizer construction (Z2) comprises at least 4 nozzles or atomizers, the nozzles or atomizers preferably being arranged as described above and being depicted by way of example in FIG. 4.

The amount of binder liquid which can act on a particle as a result of the thus constructed nozzles or nozzle number allows an optimal uptake of moisture by the particles. The particles adsorb the liquid better as a result. Owing to the process control, more particularly the temperature and air velocity in the fluidized bed, the surfaces of the particles dry only very slowly, i.e. remain tacky for a long period. The enlarged adhesive surfaces thus obtained lead to an enhanced agglomeration of the fluidized particles in comparison with conventional processes. This gives rise to very large agglomerate particles which, owing to the enlarged adhesive surfaces, also have an increased mechanical stability.

The contact area of the circulating particles in relation to one another is thereby further enlarged, and thus leads to an enlargement of the contact areas of the particles, and so large agglomerate particles are rapidly formed.

In a further preferred embodiment, the nozzle or atomizer construction (Z2) is constructed such that the binder liquid from the nozzle or atomizer construction (Z2) in the internal fluidized bed (B) is sprayed from the bottom to the top.

The construction of the nozzles or atomizers in the device according to the invention supports in particular the upward flow of the particles in the fluidized bed and thus also the distribution of the particles in the fluidized bed, which leads to the fluidized bed not collapsing once the particles reach a size of above 200 μm. In particular, the circulation which constantly keeps the particles in motion allows a large probability of collision amongst the particles.

In a further preferred embodiment, the nozzles or atomizers in the nozzle or atomizer construction (Z2) are pressure-spray nozzles; preferably, they are twin-fluid spray nozzles. The atomization in the fluidized bed is preferably effected by two-substance nozzles. Two-substance nozzles offer the advantage that they clean themselves because of the atomization pressure. Therefore, they do not clog during production, which could easily happen in the fluidized bed filled with product. Preferably, pressure nozzles are used with turbulence bodies. Preferably, the nozzles or atomizers have a bore diameter ø of from 0.5 to 1.5 mm, preferably from 0.7 to 1.0 mm. Twin-fluid spray nozzles are especially advantageous, since they make it possible for two different liquids and/or gases to be blown through the nozzles or to be blown into the fluidized bed. Accordingly, twin-fluid nozzles are preferably used, since the air introduced by the twin-fluid nozzles promotes the upward flow of the particles.

The nozzles (Z2) situated in the fluidized bed (B) are individually provided with pressurized air, which is regulated in each case by means of a pressure reducer (regulated range of 0-10 bar). The product and pressurized-air lines preferably consist of stainless steel and are earthed to ensure safe operation.

The binder is fed into the fluidized bed preferably at 10-100 litres/h at 1-10 bar, preferably at 20-80 litres/h at from 1 to 8 bar.

The interplay between the circulation of the particles and the use of the nozzle or atomizer construction (Z2) allows, firstly, a large probability of collision amongst the particles and, at the same time, it enlarges the adhesive contact areas of the particles, making it possible to yield large stable agglomerate particles.

Owing to the construction and control of the nozzles or atomizers, the agglomerate particles obtainable according to the invention have a compact stable structure and, accordingly, low dust values and abrasion values.

In a further preferred embodiment, the device according to the invention comprises a dam construction (G), which is likewise fitted in the fluidized bed (B) and which is placed in front of the escape opening (H) to the zigzag classifier or an external fluidized bed. The dam serves to adjust the fill level of the fluidized bed and to regularly discharge the particles and to adjust the residence time of the particles in the fluidized bed. Accordingly, the zigzag classifier or the external fluidized bed in the device according to the invention assumes the role of an air classifier (air classification). Air classification is a mechanical separation method in which particles are separated in a gas stream on the basis of their ratio of inertial or gravitational force to the flow resistance. It is a classification method (separation method in process engineering) and makes use of the principle of separation by gravitational force or centrifugal force. Fine particles follow the flow, and coarse ones follow inertial force.

The dam construction in front of the output opening to the zigzag classifier or an external fluidized bed has the advantage that, firstly, it is possible to regulate the fill level in the fluidized bed, and hence the residence time and thus the particle size, and, secondly, a portion of the particles is immediately returned to the headspace of the spray dryer. Thus, they pass through the entire process once again. In the headspace, the spraying takes place with the slurry, leading to a first agglomeration, and, below in the fluidized bed, the particles are further agglomerated, resulting in the agglomeration being promoted and the size of the agglomerate particles being influenced here once more.

The dam construction additionally serves to regulate the amount of product in the fluidized bed, ensuring that a sufficient amount of particles is present in the fluidized bed so that an agglomeration can also take place. This in turn occurs owing to an amount of introduced binder liquid corresponding to the amount of particles, resulting in the prevention of the formation of clumps. Furthermore, owing to the dam, it is possible to prevent the presence of too much product in the fluidized bed, such that said bed can no longer be fluidized.

In a further preferred embodiment of the device according to the invention, the input temperature at the feed atomizer (Z1) is between 100° C. to 220° C. and the output temperature at the zigzag classifier is from 20° C. to 100° C., with the slurry throughput being within the range of 300 to 1200 kg/hour, and being atomized at 30 to 200 bar. Preferably, the input temperature is 190-200° C. and the output temperature is 80-20° C. or, in the case of volatile input materials, the input temperature is from 100-130° C. and the output temperature is from 50-70° C. The temperature settings are presented here only by way of example and are adjusted accordingly depending on the components.

In a further preferred embodiment of the device according to the invention, the temperature in the fluidized bed during agglomeration is between 5-90° C.

In a further preferred embodiment of the device according to the invention, the fine dust in the device that arises as a result of abrasion during spray drying and agglomeration is returned to the headspace of the spray tower by means of the zigzag classifier or an external fluidized bed.

The recirculation of the fine dust into the process has the advantage that the loss of yield is minimized and also the reduction of fine dust in the process. In addition, it has the advantage that the risk of a dust explosion is reduced or minimized too.

The agglomerate particles obtainable by the method according to the invention preferably have a dust value of less than 3, preferably less than 2, particularly preferably between 0.05 and 1.4.

The agglomerate particles obtainable according to the invention and having such dust values are advantageously low in dust, and the low dust values indicate an optimal agglomeration. This has the advantage that the filling, storage and transport of the thus obtainable agglomerate particles is substantially improved and facilitated.

The agglomerate particles obtainable by the method according to the invention preferably have a bulk weight of greater than 300 g/l.

Agglomerate particles according to the invention having such bulk weights advantageously have a stable core and thus a good stability, especially with respect to abrasion. In particular, the proportion of trapped air is low.

Moreover, the agglomerate particles obtainable by the method according to the invention preferably have a particle flowability of less than 14, preferably between 0 and 14, particularly preferably between 5 and 14, very particularly preferably between 7 and 14.

Agglomerate particles according to the invention having such flowability values are non-cohesive and preferably have a good solubility. This property is important especially for powders and agglomerate particles in the food sector, since they have a major influence on the end use and the application area. Accordingly, the thus obtainable agglomerate particles lead to an improved product quality.

In a preferred embodiment of the present invention, the agglomerate particles obtainable according to the invention are therefore present in a free-flowing, non-dust-raising form. Such agglomerate particles are accordingly easier to dispense, better to process, and widely applicable in very many different areas.

The agglomerate particles obtainable by the method according to the invention are larger than 200 µm. Preferably, the agglomerate particles obtainable by the method according to the invention are larger than 300 µm and can become up to 1000 µm in size. Preferably, agglomerate particles according to the invention are between 300 µm and 800 µm, preferably between 400 µm and 700 µm, in size. However, the size of the agglomeration particles is varied according to the application area, and so the agglomeration particle sizes stated here are not intended to represent a restriction, but merely represent an exemplary implementation of possible agglomerate sizes.

The production of the agglomerate particles by means of the device according to the invention is typically subject to the process parameters, such as temperature, pressure, flow, etc. Ideally, stable large agglomerate particles having good bulk weights, flowability values and low dust values can be produced by adjusting the above-mentioned temperatures. Accordingly, the parameters adjusted for the production of agglomerate particles can vary depending on the agglomerate required, and so the above parameters are guideline values which are not intended to be restrictive.

It is especially important here in the production of large agglomerate particles that the air in the internal fluidized bed has to be adjusted such that the particles fluidize and have a uniform distribution in the bed. Therefore, the nozzle or atomizer construction (Z2) is an important aspect. Similarly, the regulation of the amount of product in the fluidized bed is an essential aspect which influences the production of large particles. Furthermore, the temperatures at the input and output of the fluidized bed must be regulated such that an agglomeration is possible, i.e. preferably at temperatures which are not excessively hot, so that the binder does not directly dry and thus the particles cannot stick together, and also temperatures which are not excessively cold, since the product otherwise becomes wet and the particles would clump and the fluidized bed would collapse (wet operation).

The present invention further provides agglomeration particles obtainable according to the invention, the agglomerate particles being flavouring particles.

Especially in the area of flavourings used in the feedstuff, foodstuff and food sector, the requirements for such agglomerate particles are very high. Likewise, owing to the flavouring agglomerate particles obtainable according to the invention, the flavourings can be used especially widely in the feedstuff, foodstuff and food sector. Also, the flavourings can be introduced particularly well into the feedstuff, foodstuff and food, making it possible to achieve an improved sensory effect.

Suitable flavourings and flavouring substances for the production of the particles of the present invention can preferably be found in, for example, "Riechstoffe" (Odorants), in Steffen Arctander, in "Perfume and Flavor Chemicals", self-published, Montclair, N.J. 1969; H. Surburg, J. Panten, in "Common Fragrance and Flavor Materials", 5th edition, Wiley-VCH, Weinheim 2006. Examples include: esters (saturated or unsaturated) such as, for example, ethyl butyrate, allyl caproate, benzyl acetate, methyl salicylate; organic acids (saturated and unsaturated) such as, for example, butyric acid, acetic acid, methylbutyric acid, caproic acid; alcohols (saturated and unsaturated) such as, for example, ethanol, propylene glycol, octenol, cis-3-hexanol, benzyl alcohol, phenylethyl alcohol; aldehydes (saturated and unsaturated) such as, for example, acetaldehyde, isobutyraldehyde, nonadienal, benzaldehyde, 3-phenylacetaldehyde; ketones such as, for example, menthone; ethers such as, for example, 4-hydroxy-5-methylfuranone, 3-hydroxy-4,5-dimethyl-2(5H)-furanone, 2,5-dimethyl-3-hydroxy-2(3H)-furanone, 2(5)-ethyl-4-hydroxy-5(2)-methyl-3(2H)-furanone, p-methoxybenzaldehyde, guaiacol, methoxyvinylphenol; acetals such as, for example, acetaldehyde diethyl acetal; lactones such as, for example, gamma-decalactone; terpenes such as, for example, limonene, linalool, terpinene, terpineol, citral (geranial and neral), menthol; sulphides and disulphides such as, for example, dimethyl sulphide, difurfuryl disulphide, methylthiopropanal; thiols such as, for example, methylfuranthiol; pyrazines and pyrrolines such as, for example, methylpyrazine, acetylpyrazine, 2-propionylpyrroline, 2-acetylpyrroline, Acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidenephthalide, carvone, camphene, caryophyllene, cineole, cinnamyl acetate, citral, citronellol, citronellal, citronellyl acetate, cyclohexyl acetate, cymene, damascone, decalactone, dihydrocoumarin, dimethyl anthranilate, dimethyl anthranilate, dodecalactone, ethoxyethyl acetate, ethylbutyric acid, ethyl butyrate, ethyl caprate, ethyl caproate, ethyl crotonate, ethyl furaneol, ethylguaiacol, ethyl isobutyrate, ethyl isovalerate, ethyl lactate, ethyl methylbutyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropylmethylthiazole, lauric acid, levulinic acid, linalool, linalool oxide, linalyl acetate, menthol, menthofuran, methyl anthranilate, methylbutanol, methyl butyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyl jasmonate, 2-methylmethylbutyrate, 2-methyl-2-pentenoic acid, methyl thiobutyrate, 3,1-methylthiohexanol, 3-methylthiohexyl acetate, nerol, neryl acetate, trans,trans-2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl alcohol, phenylethyl isovalerate, piperonal, propionaldehyde, propyl butyrate, pulegone, pulegol, sinensal, sulfurol, terpinolene, 8,3-thiomenthanone, 4,4,2-thiomethylpentanone, thymol, delta-undecalactone, gamma-undecalactone, valencene, valeric acid, vanillin, acetoin, ethyl vanillin, ethyl vanillin isobutyrate (=3-ethoxy-4-isobutyryloxybenzaldehyde), 2,5-dimethyl-4-hydroxy-3(2H)-furanone and its derivatives (in this case preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (in this case preferably ethyl maltol), coumarin and coumarin derivatives, gamma-lactones (in this case preferably gamma-undecalactone, gamma-nonalactone, gamma-decalactone), delta-lactones (in this case preferably 4-methyl delta-decalactone, massoilactone, delta-decalactone, tuberolactone), methyl sorbate, divanillin, 4-hydroxy-2(or 5)-ethyl-5(or 2)-methyl-3(2H)-furanone, 2-hydroxy-3-methyl-2-cyclopentenone, 3-hydroxy-4,5-dimethyl-2(5H)-furanone, isoamyl acetate, ethyl butyrate, n-butyl butyrate, isoamyl butyrate, ethyl 3-methylbutyrate, ethyl n-hexanoate, allyl n-hexanoate, n-butyl n-hexanoate, ethyl n-octanoate, ethyl 3-methyl-3-phenylglycidate, ethyl 2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl) disulphide, furfuryl mercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethyl pyrazine, 2-ethyl-3,5-dimethylpyrazine, 2-ethyl-3,6-dimethyl pyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guaiacol, 3-hydroxy-4,5-dimethyl-2(5H)-furanone, 3-hydroxy-4-methyl-5-ethyl-2(5H)-furanone, cinnamaldehyde, cinnamyl alcohol, methyl salicylate, isopulegol and (not explicitly mentioned here) stereoisomers, enantiomers, positional isomers, diastereomers, cis/trans-isomers or epimers of these substances.

The term "food" or "foodstuff" encompasses in particular products which are food in accordance with REGULATION (EC) No. 178/2002 OF THE EUROPEAN PARLIAMENT AND OF THE COUNCIL of 28 Jan. 2002. According to said regulation, "food" means any substance or product, whether processed, partially processed or unprocessed, intended to be, or reasonably expected to be ingested by humans.

In the present invention, the term "food" or "foodstuff" is also to be understood to mean food supplement.

A person skilled in the art is aware of and familiar with food supplements in different embodiments. They consist of, inter alia, vitamins and/or minerals and are used to ensure a sufficient supply of nutrients to humans and animals. In particular, such food supplements can prevent deficiency symptoms in the event of unhealthy nutrition. They can be used preventively to at least delay the occurrence of various diseases. Such food supplements are usually obtainable without a prescription.

The present invention further provides for the use of the agglomerate particles obtainable according to the invention for producing feedstuff, foodstuff or food products.

The agglomerate particles obtainable according to the invention are preferably intermediate products and can be used in end products in the food sector, preferably as flavouring agglomerate particles. Preferably, the food is, for example, baked goods, for example bread, dry biscuits, cake, other pastry, long-life baked goods or snacks such as, for example, crackers, lye roll, biscuits, potato crisps or corn chips (e.g. tortilla chips), wheat flour products (e.g. pastry sticks, croutons, bread chips, rusk, extruded and non-extruded crispbreads), confectionery (for example chocolates, chocolate bar products, other bar products, fruit gum, hard and soft caramels, chewing gum), alcoholic or non-alcoholic drinks (for example coffee, tea, iced tea, wine, wine-containing drinks, beer, beer-containing drinks, liqueurs, schnapps, brandies, (carbonated) fruit-containing soft drinks, (carbonated) isotonic drinks, (carbonated) soft drinks, juice drinks, alcoholic and non-alcoholic spritzers, fruit and vegetable juices, fruit or vegetable juice preparations, "instant" products, such as instant drinks (for example instant cocoa drinks, instant tea drinks, instant coffee drinks, instant fruit drinks), meat products (for example ham, cooked sausage or uncooked sausage preparations, seasoned or marinated fresh meat or salt meat products), eggs or egg products (dried egg, egg white, egg yolk), cereal products (for example breakfast cereals, muesli bars, pre-cooked ready rice products), milk products (for example milk drinks, buttermilk drinks, ice cream, yoghurt, kefir, cream cheese, soft cheese, hard cheese, powdered milk, whey, whey drinks, butter, buttermilk, products containing partially or fully hydrolysed milk protein), products composed of soya protein or other soya bean fractions (for example soya milk and products made therefrom, fruit drinks containing soya protein, soya lecithin-containing preparations, fermented products such as tofu or tempeh or products made therefrom), products composed of other plant protein sources, for example oat protein drinks, fruit preparations (for example jams, sorbet, fruit sauces, fruit fillings), vegetable preparations (for example ketchup, sauces, dried vegetables, frozen vegetables, pre-cooked vegetables, bottled vegetables), snack articles (for example baked or fried potato crisps or potato dough products, corn- or peanut-based extrudates), fat- and oil-based products or emulsions thereof (for example mayonnaise, tartar sauce, dressings), other ready meals and soups (for example dried soups, instant soups, pre-cooked soups), spices, spice mixtures and especially seasonings which are, for example, used in the snack sector.

Accordingly, a preferred embodiment is agglomeration particles obtainable according to the invention, the agglomerate particles being an intermediate product which is later incorporated into a feedstuff, food or foodstuff. In a further preferred embodiment, the agglomeration particles obtainable according to the invention are flavouring particles.

"Feedstuff" in the context of this description is any feedstuff suitable for animal consumption.

"Animals" in the context of this description are understood to mean the following animals, and also all strains and subspecies of the presently listed animals, the present list not being intended to be restrictive: fishes, hamsters, hares, domestic cats, dogs, cats, rabbits, mice, guinea pigs, snakes, reptiles, spiders, rats, chinchilla, insects, all camelids such as, for example, llamas and alpacas; horses, small horses (pony, etc.), reindeers, cattle, dairy cattle, sheep, pigs, goats, mites, honey bees, silkworms, dromedary, elk, elephant, donkey, camel, mink, coypu, ferrets, all bird and poultry species (paleognaths and neognaths) such as, for example, carrier pigeons, canaries, parakeet species such as cockatiel, budgerigar, parrots, hill mynas, starlings, ravens, falcons and other birds of prey, chickens, ducks, pheasants, geese, ratites, guinea fowls, partridges, doves, turkeys, quails.

Preferred embodiments of the present invention are common feedstuffs selected from the following group: high-starch feedstuffs, oil-containing feedstuffs, green feedstuffs, wet feedstuffs, dry feedstuffs, feed supplements, mineral feed, concentrated feed, basic feed, supplementary and active-ingredient-containing feed, molasses feed, fibrous feed, feed comprising intact or slightly chopped-up plants, high-water-content feed, high-nutrient feed, pelleted feed, muesli feed, prepared feed, complete feed, single-component feed such as, for example, cereal grains, products and by-products thereof, grain legumes, products and by-products thereof, oil seeds and oil fruits, and other oil-providing plants, products and by-products thereof, by-products of fermentation and of distillation, tubers and roots, products and by-products thereof, other seeds, fruits, plants, products and by-products thereof, milk products, minerals, fish and other marine animals, products and by-products thereof, animal meat, animal meat products and by-products thereof, food-identical substances and products and by-products from the food industry, protein products from microorganisms, hydroxyl analogues of methionine and salts thereof, amino acids and salts thereof, urea and derivatives thereof and ammonium salts, other NPN compounds.

Production Method

The present invention further provides a method for producing agglomerate particles having a mean size of greater than 200 µm, preferably greater than 300 µm, said method comprising the steps of:

(i) producing pulverulent particles by means of a spray-drying process, in a spray-drying agglomeration device having a spray-drying segment (A) in the upper region of a chamber for drying feed liquid sprayed by a feed liquid atomizer (Z1), (ii) spraying the pulverulent particles with a binder liquid, in an integrated fluidized bed (B) in the spray-drying agglomeration device, which bed is situated in the lower region of a chamber, in which region the powder of the spray-drying segment from step (i) is sprayed with a binder liquid by means of a nozzle or atomizer construction (Z2) mounted at the bottom of the fluidized bed (B), the particles being constantly kept in motion and whirled up during production.

The rest of the construction for the spray-drying agglomeration device is as already described above.

In a preferred embodiment, the spray-drying agglomeration device comprises a dam construction (G) which is integrated in the fluidized bed (B) and which is placed in front of the escape opening (H) to the zigzag classifier.

Such a method allows the production of large agglomerate particles which can be larger than 200 µm, preferably larger than 300 µm, and up to 600 µm or even up to 1000 µm in size and can accordingly cover an application requirement in the food sector that has so far not been possible.

EXAMPLES

Examples of Production

Production of Agglomerate Particles

Agglomerate particles loaded with flavouring are produced. To this end, primary particles are produced in the upper chamber of the apparatus by means of spray drying, which particles are then sprayed with binder liquid in the lower part of the apparatus. Here, it is ensured that a sufficient amount of primary particles is constantly supplied to the fluidized bed in order to sustain the process.

The input air in the tower is 160-200° C. The temperature in the fluidized bed is restricted to 30-50° C., so that the primary particles have sufficient time to agglomerate as a result of the sprayed dispersion. Here, excessively high temperatures would lead to high drying rates and, as a result, the sprayed dispersion could dry on the particle surfaces before agglomeration has taken place.

The process is otherwise started under standard conditions until the fluidized bed has been filled up to a tower-specific level. This is achieved by the dam being initially closed. This is followed by the feeding of the "binder liquid" into the fluidized bed, and the dam is opened. This suspension can either consist of the slurry itself or—if an additional sealing of the particle surfaces is desired and a high mechanical stability is required—be admixed with low-molecular-weight substances having a good adhesive action such as, for example, dextrose, sorbitol, mannitol, etc. Wetting with water or water vapour is possible too depending on the desired particle properties.

Figure 1:
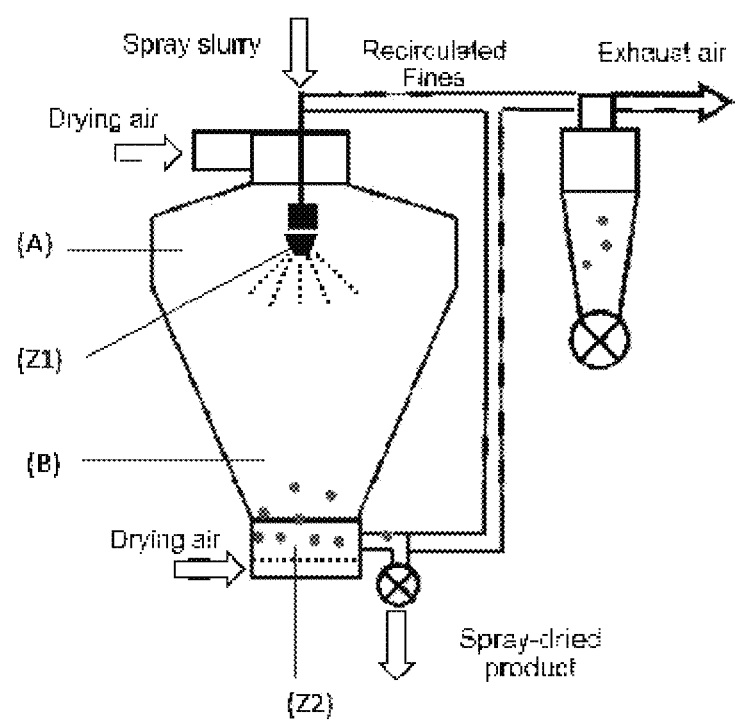
FIGS. 1 to 6.
Figure 2:
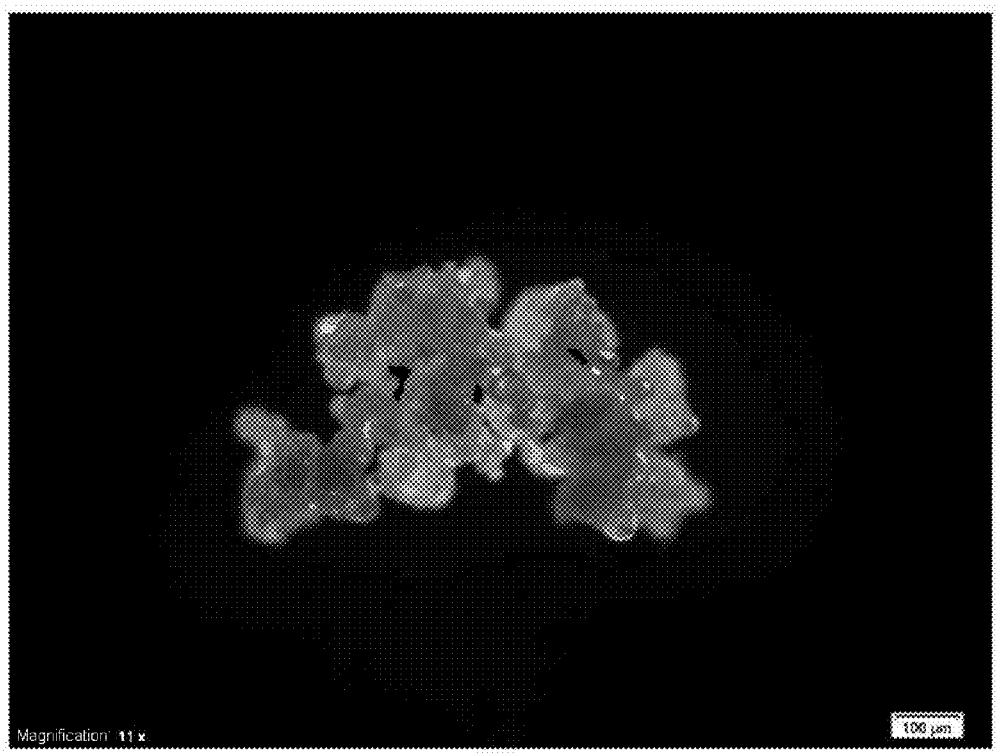
Figure 2:
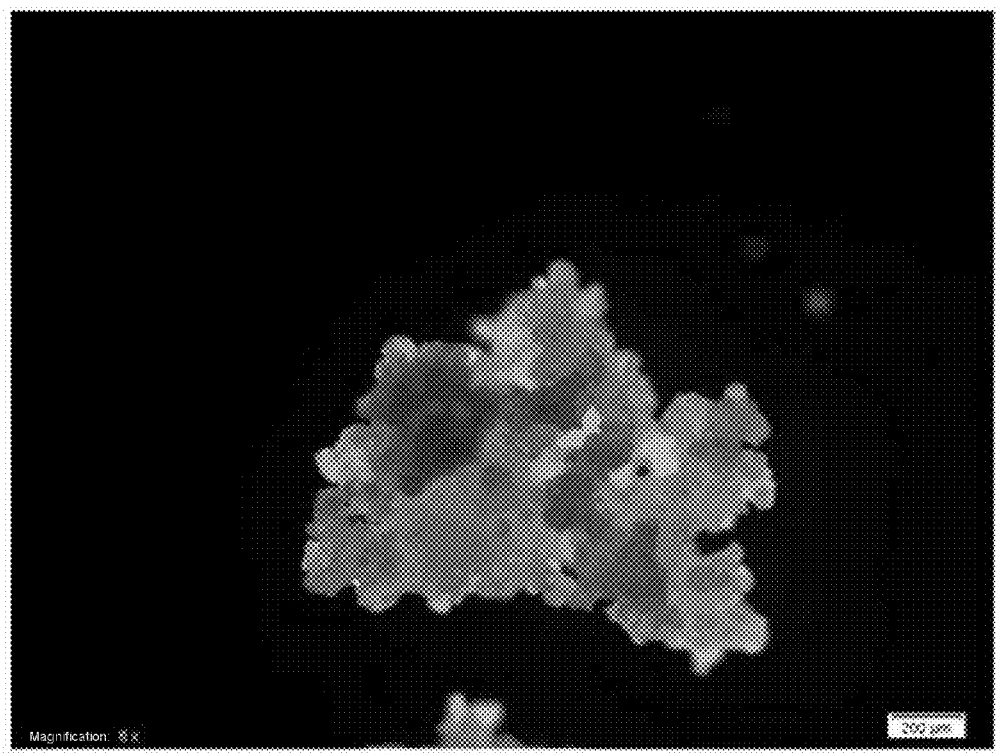
Figure 3:
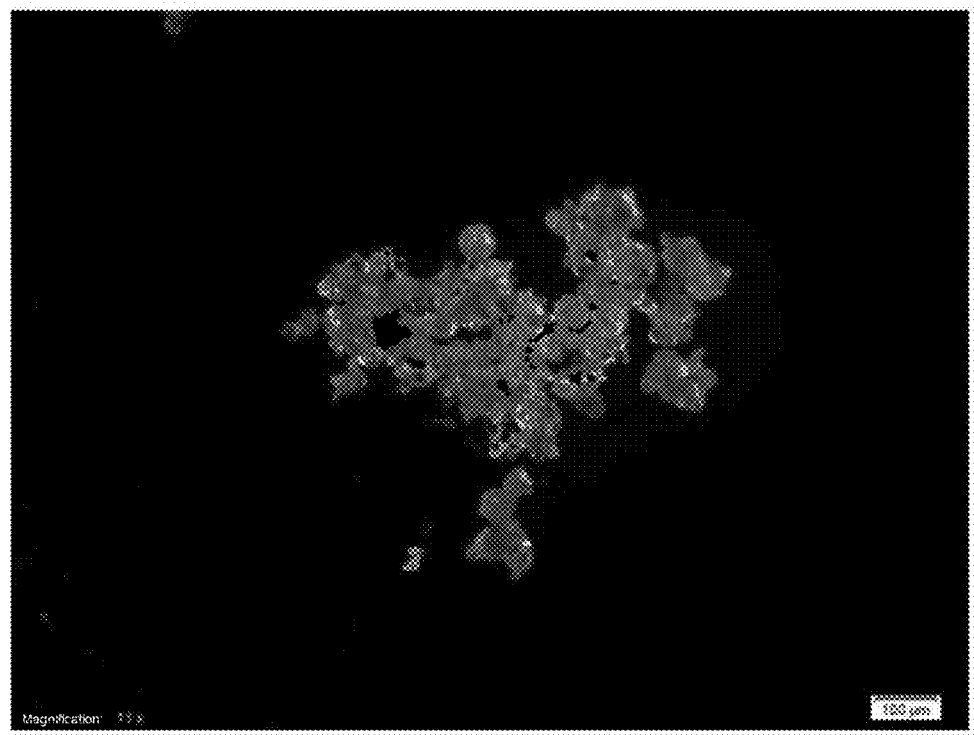
Figure 3:
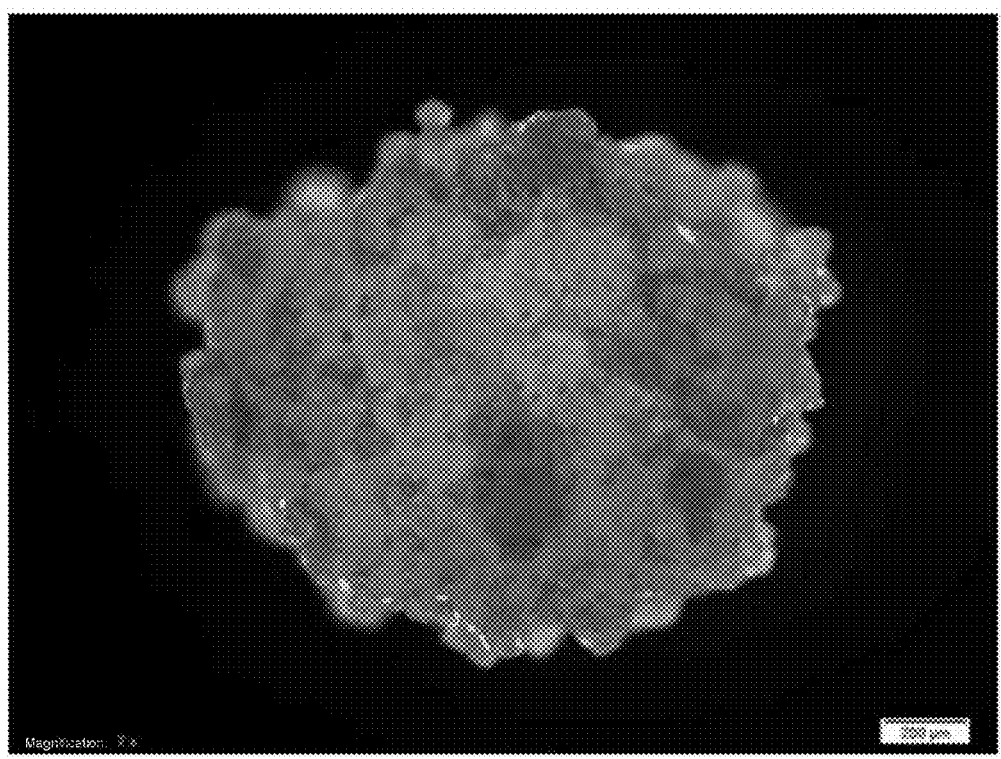

The nozzles from which the binder liquid is sprayed into the bed are small-bore two-substance nozzles which generate an extremely fine spray mist in the fluidized bed. The air streams introduced via said nozzles contribute to the fluidization of the particles and ensure a uniform wetting of the particles and thus a controllable agglomeration without clumps. FIG. 1 clarifies the position of the individual technical device features in an agglomeration spray-drying apparatus for the production of the large agglomerate particles according to the invention.

Effect of the Nozzle or Atomizer Construction on Agglomerate Particles

Agglomerate particles were produced, and the effect of the nozzle or atomizer construction (z) in the internal fluidized bed (b) on the agglomerates was tested. The results can be found in the table below.

TABLE 1

Results with different nozzle or atomizer constructions

| Nozzle or atomizer construction | Atomization pressure in the fluidized bed | Volume flow in the fluidized bed | Observation |
|---|---|---|---|
| 1 nozzle (test tower) | 0.5-2 bar | 0.5-3 litres/h | Large stable agglomerates |
| 4 nozzles | 3-6 bar | 30-80 litres/h | Stable agglomerates, good distribution in the fluidized bed |
| Ring line having 6-8 nozzles | 3-6 bar | 30-80 litres/h | Large stable agglomerates, uniform atomization in the fluidized bed |
| Double ring line having 3 nozzles in the inner ring and 6 nozzles in the outer ring | 3-6 bar | 30-80 litres/h | Large stable agglomerates, even better distribution |

The lower the pressure, the larger the drops and the less uniform the droplet distribution. This can lead to a more rapid agglomeration. However, there is the risk that the nozzles no longer blow themselves clear at a lower pressure (i.e. they clog), that the density of the particles increases too rapidly and the particles are insufficiently whirled up and the fluidized bed thus collapses. Accordingly, the pressure must be adapted to both the supply of primary particles and the fed-in amount of binder liquid. This optimization must be carried out for each configuration (tower, fluidized bed size, throughput of primary particles, etc.).

Density and Structural Determination of the Agglomerate Particles

I) Particle Size of the Agglomerate Particles

The particle sizes of the agglomerates produced according to the invention were determined by means of a measurement by means of laser diffraction.

The principle of laser diffraction is a distinctly flexible technique, having fundamentally the means of measuring the size of any material in another. The only conditions of the technique are that each phase is optically demarcated from the other and the medium is transparent for the laser wavelengths. This means that the refractive index of material and of the surrounding medium must differ.

The measurement is achieved by introducing the sample into the laser beam by means of the corresponding modules for powders or emulsions/suspensions. The light scattered by the particles is detected. The entire laser output beamed towards the path from this system is measured and also allows the sample concentration to be inferred.

The instrument available here (Malvern Mastersizer 2000 with Scirocco drying unit) provides the means of measuring powders up to a maximum particle size of 2 mm. With said instrument, it is possible to apply a dispersion pressure of from 0 to 4 bar to feed in the powder. However, care should be taken not to destroy the product while this is done, since, at the pressure set, suction is carried out against an impact plate during the feeding-in process.

II) Structural Determination of the Agglomerate Particles

The structure of the agglomerates produced according to the invention was determined on a black sample plate by means of a loupe (from Will, with camera).

For better identification of structures of dried flavourings or composition of applications such as, for example, flavoured tea mixtures, use is made of a loupe. It is possible here to analyse a sample with a magnification between 7- and 45-fold.

FIG. 2 and FIG. 3 show the agglomerate particles produced according to the invention in comparison with agglomerates produced by the established method. The microscopic images make it clear that the particles produced according to the invention are in some cases more than double the size (about 600 μm and larger) of the standard particles. At the same time, they have a distinctly denser and thus more stable structure.

The results are displayed in Table 1.

Abrasion Resistance of Dry Products

The abrasion test was carried out using a friabilator.

With this analysis method, the mechanical stress to which a product is exposed during transport and further processing is simulated.

As bulk material, the product is subjected to a rotational movement and free fall during the analysis, and so non-stable products break or can be abraded at possible edges. The resulting abrasion is a fine fraction which distorts the actual product or cannot be used for further processing.

The abrasion test using a friabilator was carried out under the following conditions:

| Intensity | Duration | Amount weighed |
|---|---|---|
| Level 3 | 10 min | 50 g |

It can be seen that the particle size is reduced as a result of rubbing for all the samples, even for the mechanically highly stable standard particles. However, it can also be seen that, even after the strong mechanical stress of d(50) μm, the particle produced according to the invention is still within the range of 300-600 μm (see Table 3).

Determination of the Flowability of the Agglomerate Particles The flowability of the agglomerate particles was determined using a Powder Flow Analyser instrument. This method allows the measurement of the flowability of powders.

To this end, the powder sample is introduced into a cylindrical container. The stirrer, with its inclined stirring blades rotating, is then guided up and down through the sample. This occurs at a defined angle and at a defined speed. From the resistance of the powder, it is then possible to calculate the FFC value, a measure of flowability.

Flowability is an essential criterion for transfer and dispensing processes in production or for the client.

The advantage of this measurement method is the possibility of characterizing even non-free-flowing powders with a value, this not being possible with conventional methods such as angle of repose.

The flowability of the agglomerates was measured as FFC value.

The following FFC scale is applicable:

| | |
|---|---|
| 0 < FFC < 11 | free-flowing |
| 11 < FFC < 14 | easy flowing |
| 14 < FFC < 16 | cohesive |
| 16 < FFC < 19 | highly cohesive |
| FFC >19 | hardening |

It can be seen in Table 2 that all the agglomerates produced according to the invention can be classified as free-flowing.

Determination of the Dust Values of the Agglomerate Particles

The dust values of the agglomerates produced were determined in accordance with DIN 55992-2 using an SP3 dust measuring instrument according to the drop method.

A defined amount of sample substance is introduced into the feeding system of a vertical downpipe. After sudden opening of the feeding system, the sample drops in the pipe to the base. When the particles hit the base plate, some particles remain there, whereas others, as airborne particles, reach the impact zone directly above the base plate. In said impact zone, the light absorbance is measured over a defined period (30 seconds) using a laser light source and a photocell. The absorbance is a measure of the dust behaviour of the sample.

Dust formation plays a major role in, for example, production, since it can lead to cross contamination or else impairment of the health of personnel. In filling processes too, there must be virtually no formation of dust, since it may not otherwise be possible to properly heat-seal packaging or to properly affix labels.

The following dust value scale is applicable:

| | |
|---|---|
| 500 | extremely high dust values |
| 150 | very high dust values |
| 30 | normal dust values |
| 5 | low dust values |
| <2 | extremely low dust values |

The agglomerate particles produced according to the invention have extremely low dust values, which would be expected to result in cohesive products according to the above-listed limits. However, in conjunction with the flowability measurements, it can be ruled out that the powders are cohesive; they are merely unusually low in dust. The agglomerates of the comparative particles all have a higher dust value (Table 2).

TABLE 2

Summary of results

| Agglomerate | Load | Density measurement | | | FFC | Dust value | Bulk weight |
|---|---|---|---|---|---|---|---|
| | | d(0.1) µm | d(0.5) µm | d(0.9) µm | | | |
| 1 | Mushroom flavouring E* | 96 | 388 | 952 | 13.6 | 0.61 | 410 g/l |
| 2 | Mango flavouring E* | 127 | 397 | 856 | 10 | 1.85 | 350 g/l |
| 3 | Peach flavouring E* | 177 | 758 | 1443 | 11.2 | 0.08 | 450 g/l |
| 4 | Lemon flavouring E* | 266 | 651 | 1288 | 12.7 | 1.24 | 430 g/l |
| 5 | Lemon flavouring E* | 270 | 509 | 910 | 11.9 | 3.08 | 580 g/l |
| 6 | Raspberry E* | 120 | 418 | 1130 | 8.9 | 1.11 | 480 g/l |
| 7 | Bergamot A | 131 | 362 | 745 | 14 | 34.8 | 460 g/l |
| 8 | Bergamot_V * | 420 | 580 | 799 | 13.3 | 19.3 | 720 g/l |
| 9 | Peach flavouring A | 42 | 146 | 308 | 10 | 20 | 330 g/l |
| 10 | Irish cream_V* | 462 | 633 | 869 | 12.8 | 4.65 | 660 g/l |

With the exception of agglomerate 5, which was produced in the production tower in accordance with the device according to the invention, agglomerates 1-4 and 6 were produced in the test tower.

A*=agglomerates produced by means of technology available on the market (spray drying with integrated agglomeration)

V*=most stable agglomerates in comparable sizes, produced according to the method of spray granulation.

TABLE 3

Abrasion test using friabilator

| Agglomerate | | Density measurement | | |
|---|---|---|---|---|
| | | d(0.1) μm | d(0.5) μm | d(0.9) μm |
| 1 | | 96 | 388 | 952 |
| | Abrasion | 84 | 266 | 703 |
| 2 | | 127 | 397 | 856 |
| | Abrasion | 126 | 380 | 788 |
| 3 | | 177 | 758 | 1443 |
| | Abrasion | 156 | 610 | 1316 |
| 4 | | 266 | 651 | 1288 |
| | Abrasion | 147 | 377 | 862 |
| 5 | | 270 | 509 | 910 |
| | Abrasion | 180 | 401 | 747 |
| 6 | | 120 | 418 | 1130 |
| | Abrasion | 104 | 309 | 798 |
| 7 | | 131 | 362 | 745 |
| | Abrasion | 122 | 309 | 629 |
| 8 | | 420 | 580 | 799 |
| | Abrasion | 395 | 536 | 732 |
| 9 | | 42 | 146 | 308 |
| | Abrasion | 42 | 146 | 308 |
| 10 | | 462 | 633 | 869 |
| | Abrasion | 419 | 574 | 782 |

Climatic Test in Climatic Chamber

Dry flavourings are usually based on sugar-containing matrices. Because of their hygroscopicity, they are sensitive to temperature in combination with humidity. However, since these flavourings are frequently exposed to such a physical stress during their processing steps and in applications, they must be tested for their compatibility as early as during the development phase.

For example, a tea mixed with dry flavouring is generally stored in the kitchen only in cardboard packaging and is regularly subjected to relatively high humidity at room temperature during this period. In addition, dry flavourings are sold all over the world and ought, even in other climate zones, to meet a certain minimum quality and stability with respect to the temperatures and humidity prevailing in said zones. It is intended that this situation be simulated by storage in the climatic chamber at an elevated humidity and elevated temperature. The results are displayed in Table 4 below:

TABLE 4

Results of climatic test in climatic chamber

| Agglomerate | Amount weighed 3.0 g Period | | | | | | |
|---|---|---|---|---|---|---|---|
| | 0 h | 5 h | 24 h | 29 h | 48 h | 120 h | 144 h |
| Lemon | 3.0 | 3.0 | 3.0 | 3.0 | 3.0 | 3.01 | 3.01 |
| Lemon V* | 3.0 | 3.02 | 3.08 | 3.09 | 3.1 | 3.11 | 3.11 |
| Bergamot | 3.0 | 3.06 | 3.11 | 3.12 | 3.12 | 3.13 | 3.13 |
| Bergamot V* | 3.0 | 3.01 | 3.03 | 3.03 | 3.03 | 3.03 | 3.03 |
| Cinnamon | 3.0 | 3.0 | 3.0 | 3.0 | 3.0 | 3.0 | 3.0 |
| Cinnamon V* | 3.0 | 3.0 | 3.03 | 3.03 | 3.05 | 3.05 | 3.06 |
| Strawberry | 3.0 | 3.0 | 3.0 | 3.0 | 3.0 | 3.0 | 3.0 |
| Strawberry V* | 3.0 | 3.03 | 3.09 | 3.09 | 3.1 | 3.1 | 3.1 |

Agglomerate particles according to the invention which were loaded with the corresponding flavourings (production as described above) were compared with agglomerate particles which were produced by means of spray drying according to the standard method (V*).

The invention claimed is:

1. A method for producing agglomerate particles having a mean size of between 700 μm and 1000 μm, said method comprising the steps of:
   (i) producing pulverulent particles by means of a spray-drying process, wherein a feed liquid is sprayed by a feed liquid atomizer into a spray-drying segment located at an upper region of a spray-drying agglomeration device and dried in the spray-drying segment to obtain pulverulent particles,
   (ii) spraying the pulverulent particles with a binder liquid, in an integrated fluidized bed in the spray-drying agglomeration device, which bed is situated in a lower region of the spray-drying agglomeration device, in which region the pulverulent particles of the spray-drying segment from step (i) is sprayed with the binder liquid by means of a nozzle or atomizer construction mounted at a bottom of the fluidized bed,
   the particles being constantly kept in motion and whirled up during production.

2. The method of claim 1, wherein the spray-drying agglomeration device comprises a dam construction which is integrated in the fluidized bed and which is placed in front of an escape opening to a zigzag classifier or an external fluidized bed.

3. The method of claim 1, wherein the nozzle or atomizer construction in the integrated fluidized bed consists of a ring line, the nozzles or atomizers being evenly spaced along the ring line, the nozzle or atomizer construction comprising at least 3 nozzles or atomizers and the nozzle or atomizer being a twin-fluid spray nozzle and the binder liquid from the nozzle or atomizer construction in the integrated fluidized bed being sprayed from the bottom to a top.

4. The method of claim 1, wherein the spray-drying agglomeration device comprises a dam construction which is integrated in the fluidized bed and is placed in front of an escape opening to a zigzag classifier.

5. The method of claim 1, wherein a fine dust in the spray-drying agglomeration device that arises as a result of abrasion during spray-drying of step (i) and agglomeration of step (ii) is returned to a headspace of the spray-drying segment by a zigzag classifier or an external fluidized bed.

6. The method of claim 1, wherein the agglomerate particles have a dust value of less than 3.

7. The method of claim 1, wherein the agglomerate particles have a bulk weight of greater than 300 g/l.

8. The method of claim 1, wherein the agglomerate particles have a flowability of less than 14.

9. The method of claim 1, wherein the agglomerate particles are present in a freeflowing, non-dust-raising form.

10. The method of claim 1, wherein the agglomerate particles are an intermediate product which is later incorporated into a feedstuff, food or foodstuff.

11. The method of claim 1, wherein the particles are flavouring particles.

12. The method of claim 1, wherein the agglomerate particles have a dust value of less than 2.

13. The method of claim 1, wherein the feed liquid at the feed liquid atomizer has a temperature in the range of from 100° C. to 220° C.

14. The method of claim 1, wherein the fluidized bed has a temperature in the range of from 5° C. to 90° C.

15. The method of claim 1, wherein the agglomerate particles have a flowability of between 7 and 14.

16. The method of claim 1, wherein the nozzle or atomizer construction is one or more small-bore two-substance nozzle.

17. The method of claim 1, wherein the binder is fed into the fluidized bed at a rate of 10-100 liters per hour and a pressure of 1-10 bar.

18. The method of claim 2, wherein the dam construction is such that its presence permits a portion of the particles to be returned to the upper region of the spray-drying agglomeration device wherein they are spray-dried by the feed liquid a first time, and then further agglomerated in the lower region by the sprayed binder fluid.

19. The method of claim 2, wherein the dam construction is such that a fine dust generated during spray drying and agglomeration is returned to the headspace by means of a zig zag classifier.

* * * * *